Oct. 9, 1923.
T. E. BROWN ET AL
1,470,140
BASCULE BRIDGE
Filed Nov. 8, 1921
4 Sheets-Sheet 1
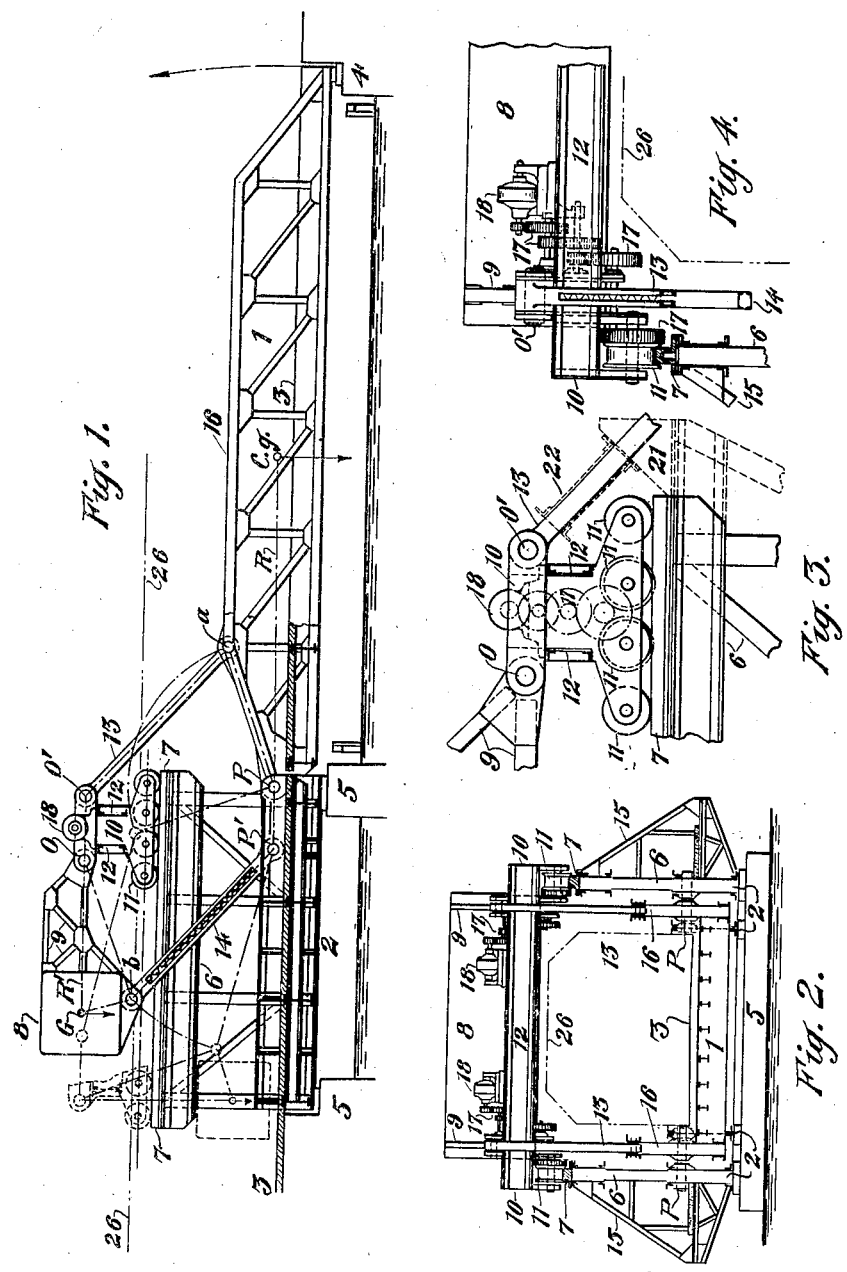
INVENTORS
Thomas E. Brown
Thomas Ellis Brown, Jr.

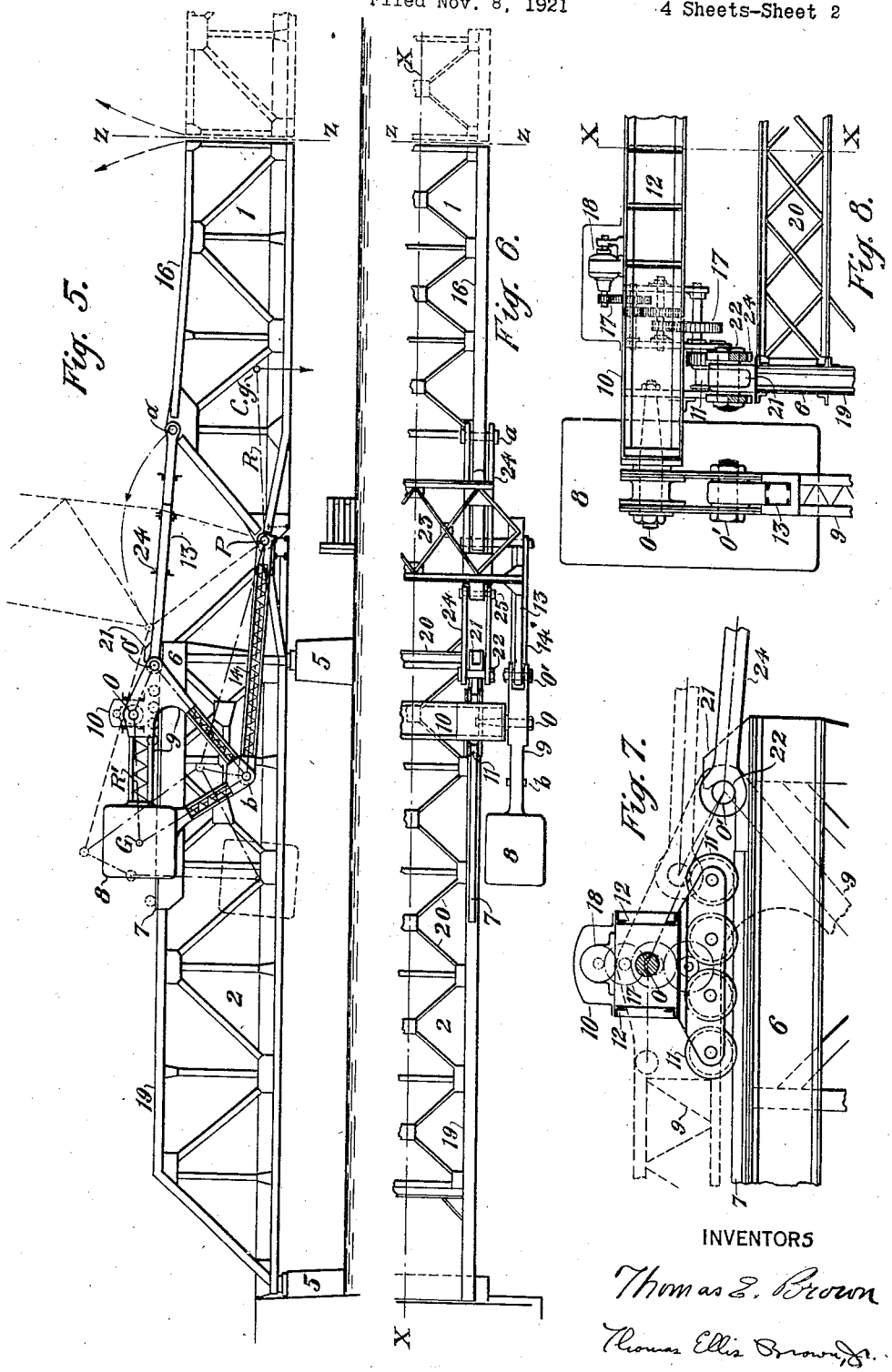

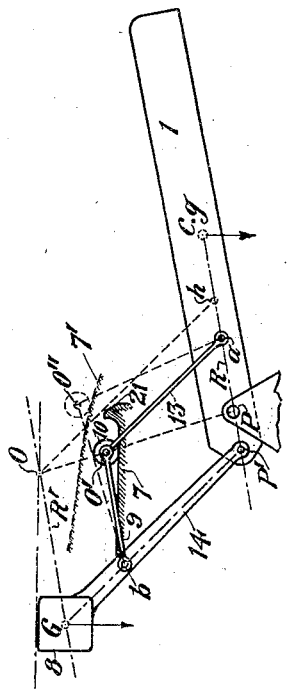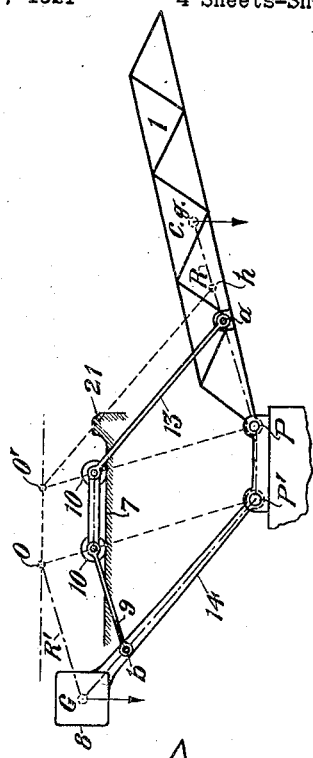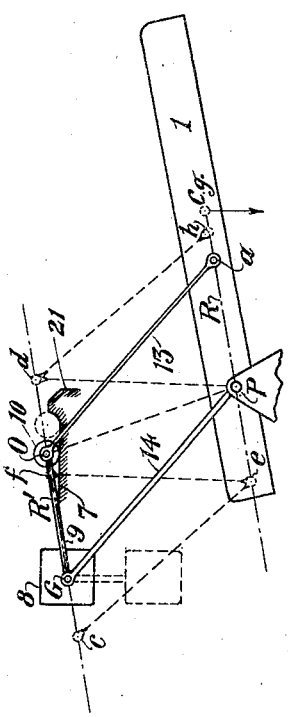

Oct. 9, 1923.
T. E. BROWN ET AL
BASCULE BRIDGE
Filed Nov. 8, 1921
1,470,140
4 Sheets-Sheet 4
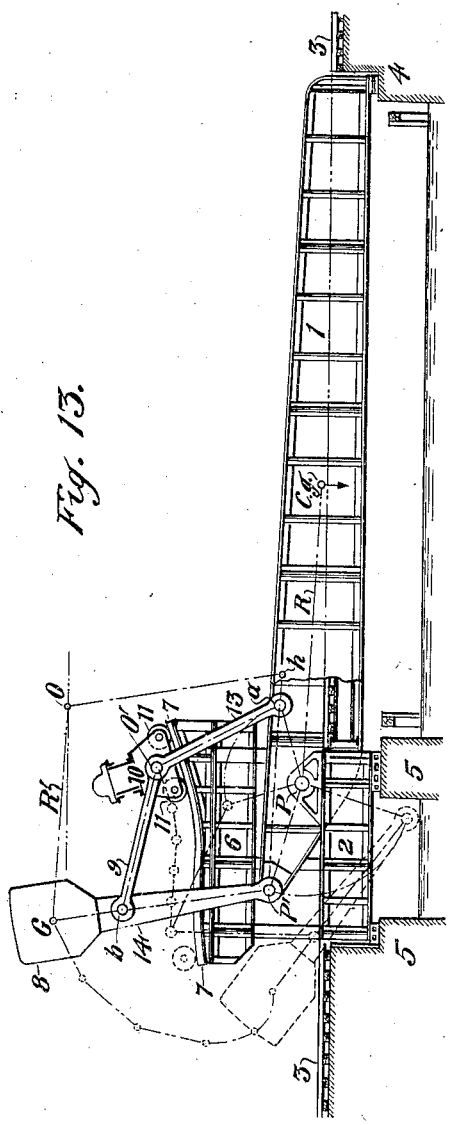
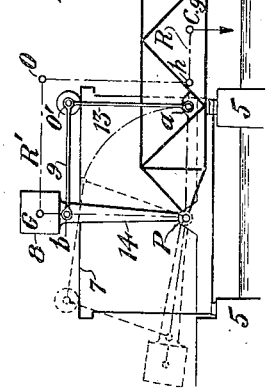
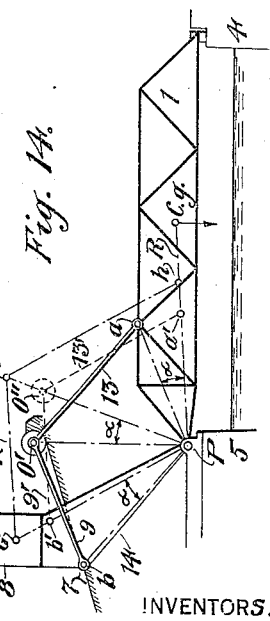
INVENTORS.
Thomas E. Brown
Thomas Ellis Brown, Jr.

Patented Oct. 9, 1923.

1,470,140

UNITED STATES PATENT OFFICE.

THOMAS E. BROWN, OF NEW YORK, AND THOMAS ELLIS BROWN, JR., OF YONKERS, NEW YORK.

BASCULE BRIDGE.

Application filed November 8, 1921. Serial No. 513,681.

*To all whom it may concern:*

Be it known that we, THOMAS E. BROWN and THOMAS ELLIS BROWN, Jr., residing, respectively, at the city of New York and at the city of Yonkers, in the county of Westchester and State of New York, have invented new and useful Improvements in Bascule Bridges, of which the following is a specification.

This invention relates to improvements in bascule bridges, and the principal objects of the invention are to balance the movable span of a bascule bridge by means of a simple mechanism readily adaptable to a variety of conditions and to provide through the medium of said mechanism a simple and positive means for opening and closing the movable span, thereby avoiding the racks or gear segments usually necessary.

We accomplish these objects by associating the counterweight with the movable span of the bridge by means of articulated polygonal frames or linkages, pivots of which are constrained to move in paths such that the linkages form a parallel motion with relation to certain geometric lines hereinafter described, and also, by supporting pivots of said linkages by wheeled trucks carrying substantial loadings, we are enabled to open and close the movable span by simple rotation of the wheels of the trucks, and we accomplish a further object of our invention by introducing limit stops for said wheeled trucks and said linkages whereby the moving span is supported in its closed position and acts as a cantilever, and so is adapted for use in double-leaf bridges.

Referring to the drawings which accompany the specification to aid the description:

Fig. 1 is a side view, in partial section, of a bridge of our construction.

Fig. 2 is an end view of Fig. 1.

Figs. 3 and 4 are enlarged views of portions of Figs. 1 and 2, Fig. 3 being an end view of the portion shown in Fig. 4.

Fig. 5 is a side view of a double-leaf bridge with long approach spans.

Fig. 6 is a half plan view of Fig. 5.

Fig. 7 is a sectional view of portions of Fig. 5 at larger scale, overlapping portions being dotted for clearness, and Fig. 8 is an end view of the parts indicated in Fig. 7.

Figs. 9, 10, 11, and 12 are explanatory diagrams showing various forms of our construction.

Fig. 13 is a heel balanced plate girder railroad bridge.

Figs. 14 and 15 are special forms of our invention.

Similar characters refer to similar parts in all the figures In general letters refer to geometric features which may or may not coincide with material elements and numerals refer to material parts of the structure.

Referring to Figs. 1 and 2: 1 is the movable span of the bridge, P the pivots about which it rotates, 2 a fixed approach span, shown in longitudinal section for clearness, 3 is the roadway, 4 is the toe pier, and 5 are piers supporting the fixed structure, the foregoing parts forming the bridge structure proper as distinguished from the balancing and operating structure.

6 is a longitudinal frame which carries the track 7. Said frames 6 are supported laterally by braces 15 shown in Fig. 2.

8 is a counterweight carried by the counterweight members 9, said members 9 being pivoted at O to a truck member 10, having rollers 11 and girders 12, said truck member 10 forming a traveling cross girder spanning the roadway and adapted to move backward and forward on tracks 7 in the manner of a traveling crane.

Members 13 and 14 are pivoted struts or links pivotally connecting the truck member 10 with the trusses 16 of the movable span 1 and the counterweight member 9 with the bridge structure. Said struts 13 and 14 are preferably parallel and of equal length and with the parts described form a flexible hexagonal polygon P'—b—O—O'—a—P, constituting a polygonal linkage in which opposite sides are parallel and which is supported and stabilized by the truck member 10 at the apexes O and O'.

C. g. is the center of gravity of the movable span 1 and G is the center of gravity of the counterweight 8.

R is the prime radius of the movable span and R' the secondary or counterweight radius and the apex O is the geometric axis, terms which will be explained hereinafter.

The geometric axis O, as shown in Fig. 1, is the axis of a material pivot which partakes of the horizontal motion of the truck member 10, and therefore said geometric axis is constrained to move in a horizontal line, and the linkage shown forms a parellel motion which maintains parallelism between the counterweight member 9 and the movable span 1 and therefore maintains the secondary radius R' parallel to the primary radius R, and in consequence, as will be explained hereinafter, the moving span 1 is balanced in all its positions by the counterweight 8.

The extreme positions of the truck member 10 and counterweight 8, when the movable span is in its fully opened position, are indicated by the dotted lines, and the extreme positions of the linkage members are indicated by broken lines.

In the form shown in Fig. 1 the counterweight 8 preferably extends across the roadway 3 and is above the traffic clearance line 26 when the span is closed, as shown in Fig. 2.

In this form the counterweight members 9 and the links 13 and 14 preferably lie in the plane of the truss 16 of the movable span 1 and the track 7 lies outside of said plane, but these positions may be interchanged, or if the width of the bridge permits, the frame 6 and track 7 may be placed inside of the plane of the truss. In either case an important function of the traveling cross-girder or truck member 10 is to transfer the loadings from the planes of the linkages to the planes of the tracks.

It will be understood that when in the description but one side of the bridge is referred to the parts described will in general be duplicated on the other side of the bridge.

Referring more especially to Figs. 3 and 4, the bridge may be operated in any suitable manner, but we prefer to open and close the movable span by moving the truck member 10 backward and forward by rotating some or all of the wheels or rollers 11, for, as will be readily understood from Fig. 1, when the wheels 11 are rotated counterclockwise the traveling cross girder or truck member 10 will move backwards and the span 1 will open, and when said wheels are rotated clockwise the truck member 10 will move forward and the span 1 will close.

The load on the truck member 10 will be constant during the whole motion and will be equal to the weight of the counterweight 8 plus the weight of said truck member 10 itself; hence there will always be ample, and usually much more than ample, adhesion between the wheels 11 and tracks 7 for operation of the span.

I prefer to rotate the wheels 11 by means of a train of gears 17 and an electric motor 18, preferably mounted on the traveling cross-girder or truck member 10.

Said train of gears 17 is shown in Figs. 3 and 4, but is omitted from Fig. 1 for clearness of the drawing.

Electric current for operation and control of the motor 18 may be carried to the traveling cross-girder 10 by trolley or flexible wires or in any other suitable manner.

The operator may be stationed at any convenient part of the structure or may ride backward and forward with the traveling cross-girder 10 as is the practice with traveling cranes.

It will be readily understood that an internal combustion engine or other motive power may be used instead of the electric motor 18.

Referring to Figs. 5 and 6: Fig. 5 is a side elevation of a double-leaf bridge having long approach spans, only the left hand end of the structure being shown in the figures, and it will be understood that the structure shown is repeated on the right hand end, the broken line z—z representing the center line of the river channel. Also in Fig. 6, which is a plan view of Fig. 5, with lower chord members omitted for clearness, only one side of the bridge is shown, and it will be understood that the parts are symetrically duplicated on the other side, the broken line XX being the longitudinal center line of the structure.

In this form it is structurally desirable that the trusses 16 of the leaves of the movable span 1 and the trusses 19 of the fixed structure 2 on each side should lie in the same plane, and also that the lateral and sway bracing 20 of the fixed structure 2 should be of the usual construction, and we therefore prefer in this form to place counterweights 8 outside of the trusses 19 of the fixed structure 2, and to place the tracks 7 on the trusses 19 of the approach span 2.

In Fig. 5 the linkage shown is a parallelogram P—b—O'—a, forming a simple parallel motion, the pivot at O' being preferably in this form on the counterweight member 9, the link 13 being connected to said member 9 instead of directly to the truck member 10.

The operation of the bridge will be understood from the description of the operation of the form shown in Fig. 1.

In double-leaf bridges, there being no pier to support the toe end of the moving leaf, provision must be made to enable the movable span to support the live load. This may be accomplished by locking together the chords of the trusses 16 at the center line of the bridge so that the two leaves may act as a simple span, but we prefer to introduce a stop 21, see Fig. 7, on a fixed part of the structure, such as longitudinal frame 6, to arrest the motion of the linkage and truck member 10 when the span is in its closed position and enable the link 13 to positively support the leaf when in said closed position so said leaf may act as a cantilever.

This will be better understood by again referring to Fig. 3, in which such a stop 21 is indicated by dotted lines, and a stop member or girder 22 is shown by dotted lines as attached to link 13 in proper position to engage stop 21 when the span is in its closed position. Obviously the stop 21 and stop member 22 are not needed in Fig. 1 unless the toe supporting pier 4 is removed and hence are not shown in that figure.

Referring again to Figs. 5, 6, and 7, it will be noted that the plane of the linkage is outside of the plane of the truss 19, as more clearly shown in Fig. 8, hence the counterweight effect must be transferred between said planes. This may be effected by the stiffness of the traveling cross-girder or truck member 10 if desired, but we prefer to accomplish this transference by means of a cross frame 23 (see Fig. 6) connecting the links 13 on the two sides of the bridge and to introduce additional parts 24 into the construction of links 13, said parts 24 carrying the stop member which in this case may be a simple pin 22, and thus when the leaf 1 is in its closed position and said pin 22 has engaged stop 21, the parts 24 form a direct connection in the plane of the trusses between the movable leaf and the fixed span. The normal motion of pin 22 will be readily understood from the dotted position of said pin shown in Fig. 7.

The stop 21 may be placed on any suitable part of the fixed structure and may engage any suitable part of the truck member 10 or any suitable part of the linkage system, but we prefer the arrangements shown in Fig. 3 and in Fig. 7.

The parts 24 may be pivoted as at 25, to allow said parts to adjust themselves to irregularities of alignment. The amount of adjusting motion around pin 25 may be limited in any suitable manner or pin 22 may be allowed to rest on and slide backward and forward on track 7 when the leaf is in motion.

The principle of our invention will be better understood from the following description and the diagrams, Figs. 9, 10, 11 and 12.

In a bascule bridge the motion of the center of gravity of the counterweight may be considered as a rotation about a "geometric axis" combined with a motion of that axis, and balance depends on the relationship of two geometric lines and said axis. These lines are the "prime radius" or line joining the pivotal point of the movable span with its center of gravity and the "secondary radius" or line joining the "geometric axis" with the center of gravity of the counterweight, the secondary radius having a length equal to the length of the prime radius multiplied by the ratio of the weight of the movable span to the weight of the counterweight.

We call these lines and axis geometric for they may or may not coincide with material structure and their existence may be purely mathematical.

It may be readily proved that a span rotating about a horizontal axis will be in balance in all its positions with a counterweight, having rotation in the same sense or angular direction as said span, if the prime radius and secondary radius remain parallel throughout the motion and the geometric axis moves in a horizontal line. This is the principle of our invention.

Referring to the diagram Fig. 9: 1 represents a movable span in any position, P its pivot and C. g. its center of gravity, and 8 represents a counterweight and G its center of gravity. $e$—C. g. is a line of indefinite length drawn through the pivot P and center of gravity C. g. The portion of this line which extends from P to C. g. is the "prime radius" R. $c$—$d$ is a line of indefinate length passing through the center of gravity G of the counterweight 8 and which is parallel to the prime radius R. On said line $c$—$d$ beginning at the center of gravity of the counterweight G, a length G—O is laid off equal to $R \times \dfrac{B}{W}$ in which B represents the weight of the bridge and $\overline{W}$ represents the weight of the counterweight and R the length of the prime radius. The point O is then the "geometric axis" and G—O is the "secondary radius" R'.

It will be evident that if any two parallel links such as are indicated by the dotted lines $e$—$c$ and $h$—$d$, or by the dotted lines $e$—$f$ and P—$d$, or by the solid lines P—G and O—$a$, are used to connect the line $c$—$d$ of the secondary radius R' with the line of the primary radius R, then said radii R' and R must remain parallel throughout any motion of the span 1, and further, if the geometric axis O is supported, as by a truck member represented by roller 10 on a horizontal track 7, the said geometric axis O will be constrained to move in a horizontal line and the conditions of balance be fulfilled.

Referring to the linkage P—G—O—$a$ shown by the solid lines in Fig. 9, which is a simple parallel motion and an elementary form of my invention, it should be noted that the counterweight 8 may be rigidly attached to a member represented by the link G—O or may be rigidly attached to a member represented by the link P—G, or may be pivotally hung from the point G as indicated by dotted lines in the figure, as in either case the conditions of balance will be fulfilled.

While parallelism is obtained by any two parallel links joining the lines of the prime and secondary radii, it should be noted that the links should not be parallel to the line P—O, as in that case there would be no motion of the geometric axis and the span could not be operated by moving that axis and an important object of the invention would be defeated.

The amount of the horizontal motion of the geometric axis O is dependent on the angularity of the linkage with the line P—O, and by choosing suitable angular position for the linkage this motion may be made greater or less as desired.

Coincidence of the geometric elements with material structure is not essential for, referring to Fig. 10, the counterweight 8 may be attached to the member 14, and truck member 10 placed at any point on the line P. O. as O′ and a linkage P′—b—O′—a be used, similar to the geometric parallelogram P′—G—O—h, and the geometric axis O will still travel in a horizontal line and the secondary radius R′ remain parallel to the prime radius R, notwithstanding that these are now only geometric elements in space.

We may also, as shown in Fig. 11, use a simple linkage O—a—P—b in which b—O and P—a are parallel and at equal angles β with the secondary and primary radii R′ and R, the counterweight 8 being carried on a suitably shaped member 9, pivoted to the truck member 10 at the geometric axis O.

Other forms of parallel motion linkages will suggest themselves, as for instance the form shown in Fig. 12 in which the pivot P′ is on a fixed part of the bridge structure, and the linkage P—P′—b—10—10—a is hexagonal and is supported by an extended truck member 10—10.

The forms shown in Figs. 9, 10, 11, and 12 may readily be adapted to double-leaf bridges by introducing a stop 21 of any suitable construction on the fixed structure which will engage the movable mechanism and prevent further forward motion of truck member 10 when the leaf arrives at its lowered position.

The simple parallel motions hereinbefore described have straight horizontal tracks, but curved or inclined tracks may often be desirable, as for instance when the movable span is carried at the end of a long approach span having curved or inclined chords.

In such cases, referring again to Fig. 11, the frame 9 may be extended and the track member placed at a point other than O, as at O′ as shown by the dotted lines, and by using a suitably curved track 7′ the geometric axis O will still travel in a horizontal line and the secondary radius R′ remain parallel to the primary radius R.

Similarly in Fig. 10, by placing the truck member 10 at some point other than O′ as O″ an inclined and slightly curved track 7′ will fulfill the conditions of balance as described.

From the foregoing description it will be clearly understood that our invention involves a parallel motion with respect to the primary and secondary radii as described, but that it is not essential that the material parts of the structure have between themselves any parallelism whatever.

This is clearly illustrated by Fig. 13 which shows a plate girder railroad bridge partially heel balanced.

In this form the counterweight 8 is rigidly attached to member 14 which is pivoted at P′ to the rearwardly extended end of the movable span 1, and the linkage is a quadrilateral P′—b—O′—a in which the links are not parallel, but nevertheless by means of the peculiarly curved profile of the track 7 the geometric conditions of balance are preserved and the movable span is balanced in all its positions.

Fig. 14 shows a special case in which the linkage is positioned relatively to the counterweight 8 and span 1, by rotating the links 9 and 13, truck member 10 and track 7 bodily about the pivot P, and thus said track 7 becomes an inclined straight track, an arrangement which fulfills the conditions of balance and will be occasionally useful.

Fig. 15 shows an application of our principle to a double-leaf span in which the counterweight is vertically over its pivot when the span is in its closed position. In this form also, anomalous as it may seem, the movable leaf is balanced in all its positions and no power is required to move the leaf other than that necessary to overcome friction and wind pressure.

Now, having described our improvements, what we claim as our invention is:

1. In a bascule bridge, a movable span, a counterweight carrying member, a support for said member adapted to travel backward and forward on a fixed part of the bridge structure, and links associating said member with said span said support and said links adapted to move the geometric axis in a horizontal line and maintain the secondary radius always parallel to the primary radius.

2. In a bascule bridge, a pivoted span, a counterweight carrying member, a support for said member adapted to travel backward and forward on a fixed part of the bridge structure, said support pivoted to said member, parallel links associating said member with said span and said links at an angle with the line joining the pivot of said span and the pivot of said support, whereby movement of said support imparts rotation to said span.

3. In a bascule bridge, a rotatable span mounted on a fixed part of the structure, a counterweight rotatable in the same direction angularly as said span, a polygonal linkage operatively associating said counterweight with said span and a support for said linkage adapted to travel backward and forward on said fixed part as said span rotates to its open and closed positions.

4. In a bascule bridge, a movable span rotatably mounted on a fixed part of the structure, a counterweight rotatable in the same direction angularly as said span, a polygonal linkage operatively associating said counterweight with said span, a support for said linkage adapted to travel backward and forward on said fixed part, and arresting means adapted to engage said fixed part and prevent further forward movement of said support when said span arrives at its lowered position.

5. In a bascule bridge, a rotatable span, a counterweight rotatable in the same direction angularly as said span, a polygonal linkage operatively associating said counterweight with said span, a support for said linkage and means to move said support backward and forward and open and close said span.

6. In a bascule bridge, a movable span, a counterweight, a polygonal linkage operatively associating said counterweight with said span and a support for said linkage constrained to travel backward and forward in a path so shaped that the geometric axis travels in a horizontal line, and the secondary radius is maintained parallel to the primary radius during the entire motion of said span.

7. In a bascule bridge, a rotatable span, a counterweight rotatable in the same direction angularly as said span, a polygonal linkage operatively associating said counterweight with said span, a traveling cross-girder supporting said linkage and spanning the roadway of said bridge, and means to move said cross-girder backward and forward to open and close said span.

8. In a bascule bridge, a movable span, a truck member adapted to move backward and forward on a suitably shaped track, pivoted members associating said truck member with said span, one of said pivoted members carrying a counterweight, said members constituting a linkage, and said track and said linkage adapted to move the geometric axis in a horizontal line and maintain the secondary radius always parallel to the primary radius.

9. A bascule bridge, a movable span, a substantially horizontal track, a wheeled truck adapted to move backward and forward on said track, a counterweight carrying member pivotally connected to said truck, a link connecting said truck with said span, a second link connecting said member with the bridge structure, said link forming a parallel motion whereby said counterweight carrying member is maintained in parallelism with said span, and means to rotate the wheels of said truck to move said truck backward and forward and open and close said span.

10. In a bascule bridge comprising a movable span, a counterweight, members carrying said counterweight rotatable in the same direction angular as said span, means associating said members with said span and tracks to support said members, said tracks and said members lying in parallel planes; a traveling cross-girder spanning the roadway of said bridge and carried on said tracks and adapted to transfer the counterweight load from the planes of said members to the planes of said tracks.

11. In a bascule bridge comprising a fixed structure, a movable span, a counterweight rotatable in the same direction angularly as said span and members associating said counterweight with said span; a member relatively movable and permanently connected with said span which engages said fixed structure when said span is closed and supports said span when in its closed position.

12. A bascule bridge having a span rotatable about a fixed pivot, a counterweight rotatable about a movable pivot and means whereby, for any movement of said span, the angular motion of said counterweight about its movable pivot is equal to the angular motion of said span about its fixed pivot.

13. A bascule bridge, having a rotatable span, a counterweight rotatable in the same direction angularly as said span and means associating said counterweight with said span, adapted to move the geometric axis in a horizontal line and maintain the secondary radius always parallel to the primary radius.

THOMAS E. BROWN.
THOMAS ELLIS BROWN, Jr.